United States Patent
Naito

(10) Patent No.: US 8,028,606 B2
(45) Date of Patent: Oct. 4, 2011

(54) TIRE PUNCTURE REPAIR DEVICE

(75) Inventor: Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 302 days.

(21) Appl. No.: 12/406,622

(22) Filed: Mar. 18, 2009

(65) Prior Publication Data

US 2009/0241738 A1   Oct. 1, 2009

(30) Foreign Application Priority Data

Mar. 25, 2008   (JP) ................................ 2008-077118

(51) Int. Cl.
*B29C 73/08* (2006.01)
(52) U.S. Cl. ............. 81/15.6; 81/15.5; 81/15.7; 81/15.2; 222/631
(58) Field of Classification Search .................. 81/15.6, 81/15.7, 486; 441/40, 41, 90, 136; D08/31; 303/121, 24.1, 54, 59, 66, 84.1; 5/909; 222/95, 222/61
See application file for complete search history.

(56) References Cited

U.S. PATENT DOCUMENTS

| | | | | |
|---|---|---|---|---|
| 5,322,194 A | * | 6/1994 | Roberts | 222/103 |
| 5,842,605 A | * | 12/1998 | Lehmkuhl | 222/95 |
| 5,909,752 A | * | 6/1999 | Gerresheim et al. | 141/38 |
| 6,431,225 B1 | * | 8/2002 | Dudley | 141/38 |

FOREIGN PATENT DOCUMENTS

| | | | | |
|---|---|---|---|---|
| EP | 1 749 645 | | 2/2007 | |
| JP | A 2003-26217 | | 1/2003 | |
| JP | A 2004-338476 | | 12/2004 | |
| JP | 2005170486 A | * | 6/2005 | 81/15.6 |
| JP | 2007-182036 | | 7/2007 | |

OTHER PUBLICATIONS

Translation of JP 2005170486 A, Jun. 2005.*
Extended European Search Report issued in corresponding European application No. 09003453.9 on Jul. 13, 2009.

* cited by examiner

*Primary Examiner* — Monica Carter
*Assistant Examiner* — Melanie Alexander
(74) *Attorney, Agent, or Firm* — Greer, Burns & Crain, Ltd.

(57) ABSTRACT

Provided is a tire puncture repair device capable of injecting a puncture sealing agent into a tire stably and speedily. A container is compressed between plate members by placing one of the plate members on the ground and pressing down the other one of the plate members with a foot. Thereby, the puncture sealing agent is discharged from the container and is injected into the tire through an injection tube. Discharge amount control means is attached to the injection tube to level an amount of the puncture sealing agent to be discharged.

8 Claims, 3 Drawing Sheets

TIRE PUNCTURE REPAIR DEVICE

BACKGROUND OF THE INVENTION

1. Field of the Invention

The present invention relates to a tire puncture repair device, and more specifically, to a tire puncture repair device capable of injecting a puncture sealing agent into a tire stably and speedily.

2. Description of the Related Art

As vehicles such as passenger cars go spare-tireless, there is growth in demand for an emergency puncture sealing agent for easy fixing of a tire puncture. There are roughly two methods proposed as a method of injecting the puncture sealing agent into the tire. In one of the methods, the puncture sealing agent contained in a container is pressured by a compressor or the like to be injected into the tire semi-automatically (see, for example, Japanese Patent Application Kokai Publication No. 2004-338476). In the other one of the methods, the container containing the puncture sealing agent is compressed by hand to inject the puncture sealing agent into the tire (see, for example, Japanese Patent Application Kokai Publication No. 2003-26217).

The former method has a problem of requiring a complicated structure which is expensive. The latter method, on the other hand, has a problem that the weak-handed cannot easily handle the device because a certain level of strength is needed to compress the container. In addition, with the latter method, it is difficult to inject the puncture sealing agent into the tire speedily.

While the puncture sealing agent is injected into the tire, an injection tube sometimes comes off a tire valve due to factors such as poor connection between the injection tube attached to the container and the tire valve, or an imbalance between an inner pressure of the container and an injection pressure. In such a case, with the conventional method, a large amount of the puncture sealing agent flows to the outside of the tire and is lost. This causes shortage of the puncture sealing agent, causing a problem of being unable to repair the tire.

SUMMARY OF THE INVENTION

The present invention has been made in consideration of the above problems, and an objective thereof is to provide a tire puncture repair device capable of injecting the puncture sealing agent into the tire stably and speedily.

To solve the above problems, a tire puncture repair device of the present invention: includes: compression means that compresses a container containing a puncture sealing agent; an injection tube to be connected to the container; and discharge amount control means that is attached to the injection tube and controls an amount of the puncture sealing agent to be discharged. In the above tire puncture repair device, the compression means is configured of paired plate members having their respective one end parts coupled to each other, and the container is sandwiched between the paired plate members.

Moreover, another tire puncture repair device of the present invention includes: a container containing a puncture sealing agent; compression means that compresses the container; an injection tube connected to the container; and discharge amount control means that is attached to the injection tube and controls an amount of the puncture sealing agent to be discharged. In the above tire puncture repair device, the compression means is configured of paired plate members having their respective one end parts coupled to each other, and the container is sandwiched between the paired plate members.

In the present invention, for example, the discharge amount control means is configured of a housing having a flow-in path and a flow-out path for the puncture sealing agent, as well as a discharge control member and a biasing member which are arranged inside the housing, and the discharge control member is arranged between the flow-in path and the flow-out path. The discharge control member moves toward the flow-out path against the bias by the biasing member so as to release the flow-in path, and further moves toward the flow-out path by a predetermined length so as to close the flow-out path. In the present invention, for example, the discharge amount control means is attached to a tip part of the injection tube through which the puncture sealing agent is discharged. In the present invention, for example, the one end part of each of the paired plate members is coupled to each other with a coupling member.

According to the present invention, the compression means for compressing the container containing the puncture sealing agent is configured of paired plate members having their respective one end parts coupled to each other, and the container is sandwiched between the paired plate members. Accordingly, even the flexible container can be stably positioned between the paired plate members. The puncture sealing agent can be discharged from the container when the container is compressed by placing one of the plate members on the ground and pressing down the other one of the plate members with a foot. Thereby, the puncture sealing agent can be speedily injected into the tire with less power.

In addition, the discharge amount control means is attached to the injection tube to control an amount of the puncture sealing agent to be discharged. Accordingly, even when the tip end of the injection tube comes off the tire valve while the puncture sealing agent is injected into the tire, a lesser amount of the puncture sealing agent flows to the outside of the tire and is lost. Even if the strength to compress the container is uneven, the discharge amount control means levels the pressure (flow speed) of the puncture sealing agent. Accordingly, the tip of the injection tube does not easily come off the tire valve, and the puncture sealing agent can be injected into the tire with stability.

DETAILED DESCRIPTION OF THE PREFERRED EMBODIMENT

Figure 1:
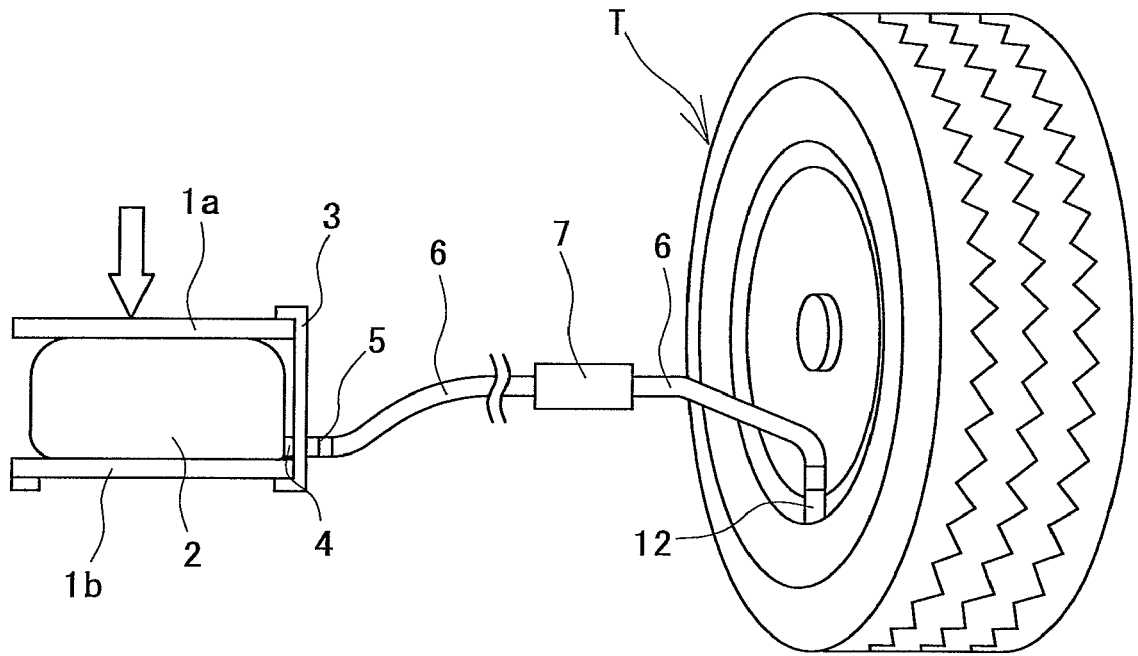
FIG. 1 is an overall schematic diagram of a tire puncture repair device of the present invention.

Based on an embodiment shown in the drawings, a detailed description will be given below of a tire puncture repair device of the present invention.

As illustrated in FIG. 1, the tire puncture repair device of the present invention includes paired plate members 1a and 1b facing each other, and an injection tube 6. One end parts of the respective plate members 1a and 1b are coupled to each other with a coupling member 3. The injection tube 6 is connected to a container 2 containing a puncture sealing agent A. Discharge amount control means 7 is attached midway of the injection tube 6 in its longitudinal direction. The discharge amount control means 7 controls the amount of the puncture sealing agent A to be discharged. The paired plate members 1a and 1b are compression means for compressing the container 2. The container 2 is to be positioned between the paired plate members 1a and 1b.

Alternatively, the tire puncture repair device according to the present invention may also be obtained by adding, in advance, the container 2 containing the puncture sealing agent A to the above-described structure of the tire puncture repair device.

Examples of materials used to form the plate member 1a and 1b include a metal, a resin, a rubber, a composite of these, or the like. The plate member 1a and 1b should preferably be formed with a material not easily deformed by an external force. Moreover, the plate member 1a and 1b should preferably be formed with a material harder (with higher rigidity) than that used to form the container 2. An area of each of the plate members 1a and 1b is set so as to be pressed down easily with a foot, for example, an area of 10 cm² to 50 cm².

Figure 2:
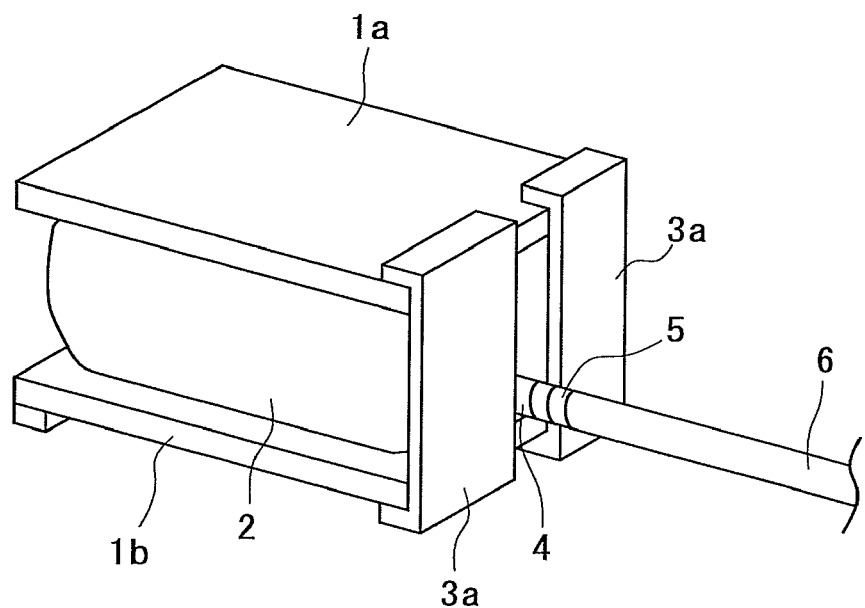
FIG. 2 is a perspective diagram illustrating compression means.

As illustrated in FIG. 2, a side of one end part of the plate member 1a and that of the plate member 1b, both end parts facing each other, are coupled to each other with supports 3a constituting the coupling member 3. The plate member 1a being one of the pair is held so that its one end part can move vertically along the supports 3a. Accordingly, the container 2 can be compressed between the plate members 1a and 1b when the plate member 1a being one of the pair is moved downward.

Figure 3:
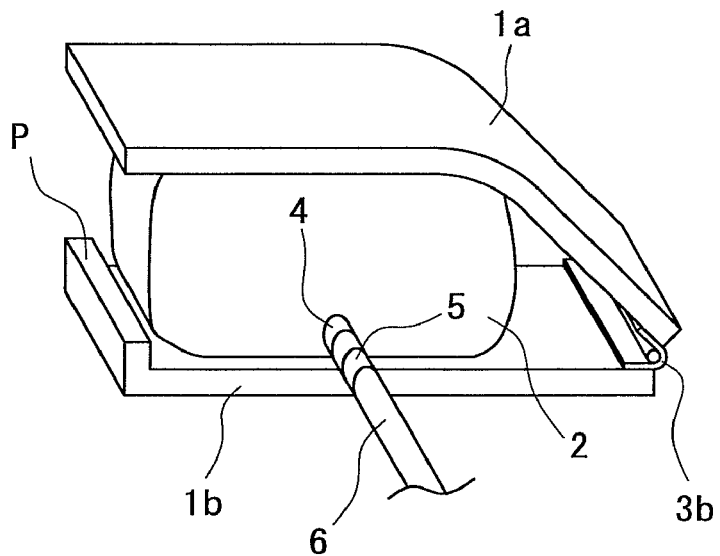
FIG. 3 is a perspective diagram showing another example of the compression means.

As illustrated in FIG. 3, the compression means may alternatively have a structure in which one end parts of the respective plate member 1a and 1b are coupled to each other with a hinge 3b constituting the coupling member 3.

Figure 4:
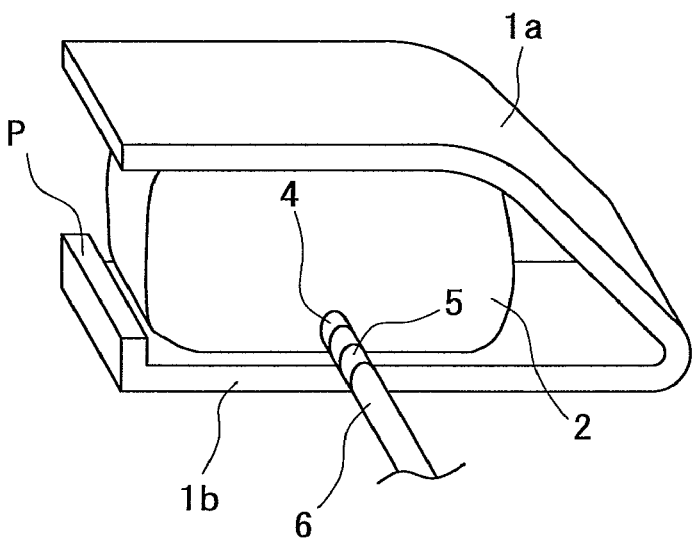
FIG. 4 is a perspective diagram showing yet another example of the compression means.

The compression means may have a structure in which one end parts of the respective plate members 1a and 1b are coupled to each other not indirectly, but directly. For example, as illustrated in FIG. 4, a single plate member may be bent so that both end parts may face each other. Thereby, the paired plate members 1a and 1b may have a structure in which no coupling member 3 is interposed between them.

As illustrated in FIGS. 3 and 4, the plate member 1b may preferably be provided with a protrusion P protruding upward. The protrusion P can prevent the container 2 from shifting. Being interposed between the paired plate member 1a and 1b, the container 2 can be protected from an external shock during storage and can be prevented from being externally damaged.

The container 2 is provided with a single discharge part 4. One end of the injection tube 6 is connected to the discharge part 4 through a tube connection mechanism 5. The tube connection mechanism 5 allows an exchange of the injection tube 6 of any length.

Figure 5:
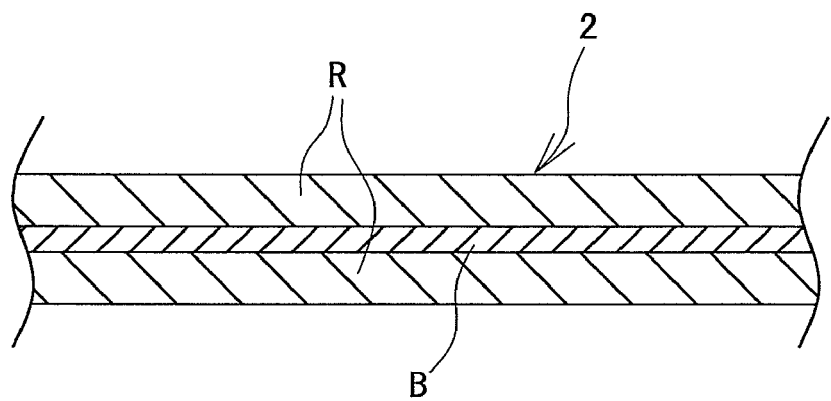
FIG. 5 is a cross-sectional diagram illustrating a structure of a wall part of a container.

Preferably, the container 2 should be easily deformed by an external force, and formed to be flexible. For example, as shown in FIG. 5, a wall part of the container 2 has a lamination structure in which a gas barrier layer B is sandwiched between flexible resin layers R.

As the resin layers R, a resin layer made of a nylon, a polypropylene, a polyethylene, a polyvinyl chloride, or the like can be used. As the gas barrier B, a metal layer (such as a metal foil layer or a metal deposited layer) made of an aluminum or the like can be used. When the wall part of the container 2 has such a lamination structure, gas can be blocked from passing through the wall part of the container 2. Accordingly, a high storage stability of the puncture sealing agent A can be obtained.

For example, the container 2 may be manufactured by overlapping two sheets each having a structure of sandwiching the gas barrier layer B between the resin layers R, and joining edge portions of the overlapped sheets with an adhesive or by heat sealing. By such a manufacturing method, the flat, sack-like container 2 having plane wall parts facing each other can be obtained.

The plate members 1a and 1b can be fixed onto the outer surface of the container 2. For example, the plate members 1a and 1b are fixed onto the outer surface of the container 2 with an adhesive or by heat sealing. Sufficient fixation strength can be obtained by fixing a 20% to 100% area of each of the plate members 1a and 1b onto the outer surface of the container 2.

Figure 6:
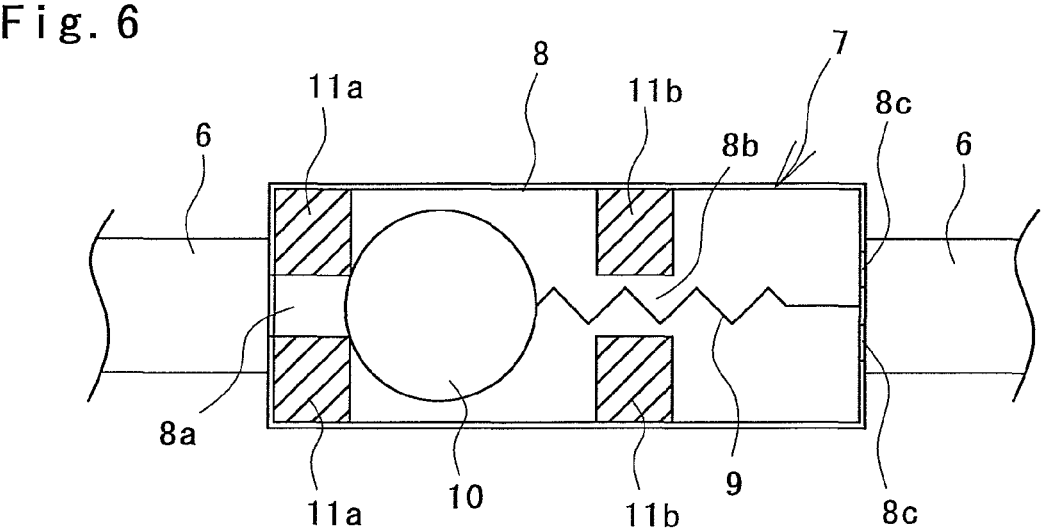
FIG. 6 is a cross-sectional diagram illustrating the inside of discharge amount control means.

As illustrated in FIG. 6, the discharge amount control means 7 is formed of a housing 8 having a flow-in path 8a and a flow-out path 8b for the puncture sealing agent A, a discharge control member 10 and a biasing member 9 which are arranged inside the housing 8. Locking members 11a and 11b, each having a through-hole, are provided inside the housing 8 at one end part and at a middle part, respectively, in its longitudinal direction. The through-hole of the locking member 11a serves as the flow-in path 8a, while the though-hole of the locking member 11b serves as the flow-out path 8b.

In the embodiment, a rigid sphere is used as the discharge control member 10. The discharge control member 10 may be anything as long as it is capable of closing the flow-in path 8a and the flow-out path 8b. For example, a metallic or resin valve can be used.

One end of the biasing member 9 is fixed to the discharge control member 10 positioned between the flow-in path 8a and the flow-out path 8b. The other end of the biasing member 9 penetrates through the flow-out path 8b and is fixed to the other end part of the housing 8 in its longitudinal direction. An elastic body, such as a spring or a rubber, can be used as the biasing member 9.

The flow-in path 8a is closed when the discharge control member 10 is biased toward the flow-in path 8a by the biasing member 9 and thus comes in contact with the locking member 11a. When the flow-in path 8a is closed this way, the puncture sealing agent A inside the container 2 is blocked from outside air, and is thus prevented from drying and solidifying.

A known emergency puncture sealing agent can be used as the puncture sealing agent A. For instance, the puncture sealing agent A can be made of a styrene-butadiene rubber (SBR) latex, a acrylonitrile-butadiene rubber (NBR) latex, or a rubber latex being, for example, a mixture of the SBR latex and the NBR latex, and a resin adhesive. A fiber material or a filler is mixed into the puncture sealing agent A to improve sealing performance. For example, the fiber material is formed by a polyester, a polypropylene, a glass, and the like; the filler is formed by a whisker, a calcium carbonate, a carbon black, and the like. In addition, a silicate or a polystyrene particle is mixed into the puncture sealing agent A to stabilize the sealing performance. In addition to the above components, an anti-freezing agent such as a glycol, an ethylene glycol, or a propylene glycol; a pH adjustor; and an emulsifier are generally added to the puncture sealing agent A.

As illustrated in FIG. 1, to inject the puncture sealing agent A into a tire T, a tip of the injection tube 6 is connected to a tire valve 12, while the plate member 1b being one of the pair is placed on the ground.

Next, the container 2 is compressed between the paired plate members 1a and 1b by pressing down the plate member 1a being the other one of the pair with a foot. As described above, one end part of the plate member 1a and that of the plate member 1b are coupled to each other with the coupling member 3. Accordingly, the container 2 can be compressed with less power by pressing down the plate member 1a on an area around its other end part. Although being flexible and easy to deform, the container 2 can be stably held between the paired plate members 1a and 1b having their respective one end parts coupled to each other.

Figure 7:
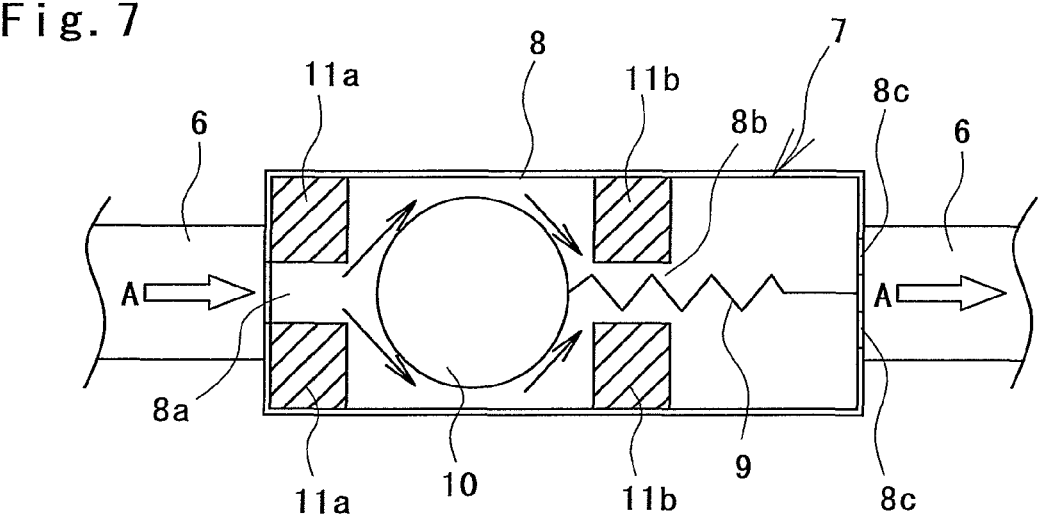
FIG. 7 is a cross-sectional diagram illustrating the inside of the discharge amount control means in which a flow-in path and a flow-out path are released.

As illustrated in FIG. 7, once the container 2 is compressed, the puncture sealing agent A is discharged from the container 2 to the injection tube 6 and flows through the flow-in path 8a into the inside of the housing 8. By the pressure of the puncture sealing agent A thus flowing in, the discharge control member 10 resists the bias by the biasing member 9 and moves toward the flow-out path 8b and away from the locking member 11a. By this operation, the flow-in path 8a is released.

When the pressure of the puncture sealing agent A flowing in and the bias force of the biasing member 9 are balanced, the discharge control member 10 thus moved toward the flow-out path 8b stays at a position not in contact with the locking member 11b, leaving the flow-out path 8b released. With both of the flow-in path 8a and the flow-out path 8b released, the puncture sealing agent A passes through the flow-out path 8b and is discharged to the injection tube 6 through a discharge opening 8c formed in the other end part of the housing 8 in its longitudinal direction. The puncture sealing agent A discharged to the injection tube 6 is injected into the tire T from the tire valve 12.

According to the present invention, the injection operation of the puncture sealing agent A can be performed by pressing down the plate member 1a with a foot. Accordingly, the puncture sealing agent A can be injected into the tire T more speedily than a method in which the container 2 is compressed by hand. Moreover, according to the present invention, a simple device having no compressor or the like can be obtained.

Figure 8:
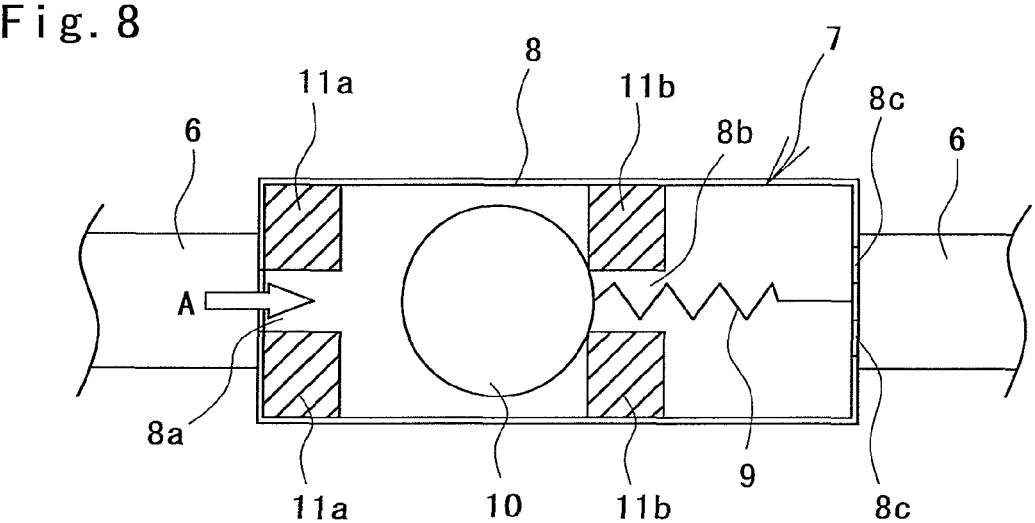
FIG. 8 is a cross-sectional diagram illustrating the inside of the discharge amount control means in which the flow-out path is closed.

If the tip part of the injection tube 6 comes off the tire valve 12 while the puncture sealing agent A is injected into the tire T, the pressure of the puncture sealing agent A flowing into the housing 8 through the flow-in path 8a changes drastically to cause the flow speed to be excessively high. As a consequence, as illustrated in FIG. 8, resisting the bias by the biasing member 9, the discharge control member 10 moves toward the flow-out path 8b by a predetermined length and comes in contact with the locking member 11b. The flow-out path 8b is closed by the discharge control member 10 in contact with the locking member 11b. Accordingly, less of the puncture sealing agent A flows to the outside of the tire T and is lost. When the container 2 is no longer compressed, the discharge control member 10 comes in contact with the locking member 11a and closes the flow-in path 8a.

The pressure of the puncture sealing agent A for closing the flow-out path 8b can be adjusted by changing the predetermined length between the flow-in path 8a and the flow-out path 8b. Moreover, the pressure of the puncture sealing agent A for releasing the flow-in path 8a and for closing the flow-out path 8b can be adjusted by changing the bias force of the biasing member 9.

When the container 2 is compressed by pressing down the plate member 1a with a foot, the compressive strength is uneven, varying the pressure (flow speed) of the puncture sealing agent A discharged from the injection tube 6. Such variations of the pressure (flow speed) of the puncture sealing agent A make it easy for the tip end of the injection tube 6 to come off the tire valve 12. In the present invention, the discharge amount control means 7 is provided to level the pressure (flow speed) of the puncture sealing agent A discharged from the flow-out path 8b into the injection tube 6. Therefore, the tip end of the injection tube 6 does not easily come off the tire valve 12, and the puncture sealing agent A can be injected into the tire T with stability.

Because the pressure (flow speed) of the puncture sealing agent A discharged through the discharge amount control means 7 is leveled, the puncture sealing agent A can be prevented from being coagulated by being stirred by the pressure variations of the puncture sealing agent A during the injection operation.

The discharge amount control means 7 may be arranged not at the middle part of the injection tube 6 in its longitudinal direction, but at any position in the longitudinal direction. By arranging the discharge amount control means 7 at the tip end part of the injection tube 6 through which the puncture sealing agent A is discharged (at the vicinity of the tip of the injection tube 6 connected to the tire valve 12), when the tip of the injection tube 6 comes off the tire valve 12, the amount of the puncture sealing agent A flowing to the outside of the tire T can be minimized.

What is claimed is:

1. A tire puncture repair device adapted to be used with a compressible container containing a puncture sealing agent, for repairing a tire, comprising:
    compression means that compresses the container containing the puncture sealing agent;
    an injection tube adapted to be connected to the container at a first end and to the tire at a second end; and
    discharge amount control means that is attached to the injection tube and controls an amount of the puncture sealing agent to be discharged, wherein
    the compression means is configured of paired plate members having their respective one end parts coupled to each other,
    the container is sandwiched between the paired plate members, and
    the discharge amount control means is operable to prevent the puncture sealing agent from being discharged to the tire when the injection tube is connected to the container and the compression means is not being operated, allow the puncture sealing agent to be discharged while the compression means is operated, and prevent the puncture sealing agent from being discharged when the injection tube becomes disconnected from the tire while the compression means is being operated.

2. The tire puncture repair device according to claim 1, wherein
    the discharge amount control means is attached near the second end of the injection tube through which the puncture sealing agent is discharged.

3. A tire puncture repair device, comprising:
    a container containing a puncture sealing agent;
    compression means that compresses the container;
    an injection tube connected to the container at a first end and to the tire at a second end; and discharge amount control means that is attached to the injection tube and controls an amount of the puncture sealing agent to be discharged, wherein the compression means is configured of paired plate members having their respective one end parts coupled to each other, and the container is sandwiched between the paired plate members, and the discharge amount control means is operable to prevent the puncture sealing agent from being discharged when the injection tube is connected to the container and the compression means is not being operated, allow the puncture sealing agent to be discharged while the compression means is operated, and prevent the puncture sealing agent from being discharged when the injection tube becomes disconnected from the tire while the compression means is being operated.

4. The tire puncture repair device according to claim 3, wherein the discharge amount control means is attached near the second end of the injection tube through which the puncture sealing agent is discharged.

5. The tire puncture repair device according to claim 1, wherein the discharge amount control means is configured of a housing having a flow-in path and a flow-out path for the puncture sealing agent, as well as a discharge control member and a biasing member which are arranged inside the housing, the discharge control member is arranged between the flow-in path and the flow-out path, the discharge control member closes the flow-in path by being biased by the biasing member toward the flow-in path, and the discharge control member moves toward the flow-out path against the bias by the biasing member so as to release the flow-in path, and further moves toward the flow-out path by a predetermined length so as to close the flow-out path.

6. The tire puncture repair device according to claim 1, wherein the one end parts of the respective paired plate members are coupled to each other with a coupling member.

7. The tire puncture repair device according to claim 3, wherein the discharge amount control means is configured of a housing having a flow-in path and a flow-out path for the puncture sealing agent, as well as a discharge control member and a biasing member which are arranged inside the housing, the discharge control member is arranged between the flow-in path and the flow-out path, the discharge control member closes the flow-in path by being biased by the biasing member toward the flow-in path, and the discharge control member moves toward the flow-out path against the bias by the biasing member so as to release the flow-in path, and further moves toward the flow-out path by a predetermined length so as to close the flow-out path.

8. The tire puncture repair device according to claim 3, wherein the one end parts of the respective paired plate members are coupled to each other with a coupling member.

* * * * *